(12) United States Patent
Xie et al.

(10) Patent No.: US 8,675,461 B1
(45) Date of Patent: Mar. 18, 2014

(54) ADJUSTING A DEFECT THRESHOLD

(75) Inventors: Jin Xie, Longmont, CO (US); Mats Oberg, Cupertino, CA (US)

(73) Assignee: Marvell International Ltd. (BM)

( * ) Notice: Subject to any disclaimer, the term of this patent is extended or adjusted under 35 U.S.C. 154(b) by 1097 days.

(21) Appl. No.: 12/546,225

(22) Filed: Aug. 24, 2009

Related U.S. Application Data

(60) Provisional application No. 61/091,619, filed on Aug. 25, 2008.

(51) Int. Cl.
*G11B 7/00* (2006.01)
*G11B 20/18* (2006.01)
*G11B 27/36* (2006.01)

(52) U.S. Cl.
USPC ............... 369/53.15; 369/53.16; 369/53.22; 369/53.35; 369/47.14; 369/44.32

(58) Field of Classification Search
USPC ............... 369/47.14, 53.15, 47.18, 59.22, 369/47.26–47.28, 47.5, 47.54, 59.19, 59.23, 369/53.35, 53.36, 53.19, 44.32, 124.14, 369/124.15

See application file for complete search history.

(56) References Cited

U.S. PATENT DOCUMENTS

| | | | |
|---|---|---|---|
| 6,226,136 B1 | 5/2001 | Chern | |
| 6,754,025 B1 | 6/2004 | Shepherd et al. | |
| 7,158,453 B2 * | 1/2007 | Sameshima | 369/44.32 |
| 7,907,484 B2 * | 3/2011 | Shiraishi | 369/47.26 |
| 8,054,717 B1 * | 11/2011 | Yang et al. | 369/47.14 |
| 8,054,719 B2 * | 11/2011 | Senba | 369/47.25 |
| 8,213,277 B2 * | 7/2012 | Onoe | 369/44.32 |
| 8,526,279 B1 * | 9/2013 | Oberg et al. | 369/47.28 |
| 2004/0095863 A1 | 5/2004 | Verboom et al. | |
| 2005/0185550 A1 * | 8/2005 | Yamaguchi et al. | 369/53.15 |
| 2005/0232452 A1 * | 10/2005 | Armstrong et al. | 381/317 |
| 2007/0139803 A1 * | 6/2007 | Kim | 360/39 |
| 2007/0280088 A1 * | 12/2007 | Lin et al. | 369/124.1 |
| 2009/0237533 A1 * | 9/2009 | Onodera et al. | 348/247 |

* cited by examiner

*Primary Examiner* — Wayne Young
*Assistant Examiner* — Dionne Pendleton

(57) ABSTRACT

Devices, methods, and other embodiments associated with adjusting a defect threshold are described. In one embodiment, an apparatus includes defect detection logic and threshold adjustment logic. The defect detection logic determines, by using a defect threshold, if a read channel has read data from a defective portion of an optical disc. The threshold adjustment logic adjusts the defect threshold based, at least in part, on a gain value of a gain loop associated with the read channel.

18 Claims, 8 Drawing Sheets

ADJUSTING A DEFECT THRESHOLD

CROSS REFERENCE TO RELATED APPLICATIONS

This application claims the benefit of U.S. provisional application with Ser. No. 61/091,619, filed on Aug. 25, 2008, which is hereby incorporated by reference.

BACKGROUND

Optical discs store information that can later be optically read. The optical disc may be a digital video disc (DVD), a compact disc (CD), a Blu-Ray disc (BD), or other types of data storage media that use optics. In some types of optical discs, the data is stored on spiral tracks as either pits or lands. Pits represent one data value and lands represent a different data value.

An optical disc is read by shining a laser onto a track and sensing reflected light using a photoelectric sensor. The pits cause reflected light to add destructively at the photoelectric sensor, while the lands cause reflected light to add constructively at the photoelectric sensor. The photoelectric sensor generates an electrical signal that corresponds to how much light is received. A read channel decodes the electrical signal to recover the data stored on the optical disc. However, a defect such as a speck of dust, dirt, or a scratch on the optical disc can make data stored at the defect location difficult or impossible to read. A better way of reading optical discs at defects may be desired.

SUMMARY

An embodiment includes an apparatus including defect detection logic and threshold adjustment logic. The defect detection logic determines, by using a defect threshold, if a read channel has read data from a defective portion of an optical disc. The threshold adjustment logic adjusts the defect threshold based, at least in part, on a gain value of a gain loop associated with the read channel.

An embodiment includes an apparatus including accumulator logic, threshold adjust logic, and notification logic. The accumulator logic combines gain values of a read channel to produce a combined gain. The threshold adjust logic adjusts a defect threshold based, at least in part, on the combined gain. The notification logic notifies the read channel that a defect is detected when the defect threshold is crossed.

An embodiment includes a method. The method determines a parameter threshold. The parameter threshold is scaled as a function of one or more gain values of a read channel. A defective signal is detected when a signal parameter of a signal being processed by the read channel crosses the parameter threshold.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
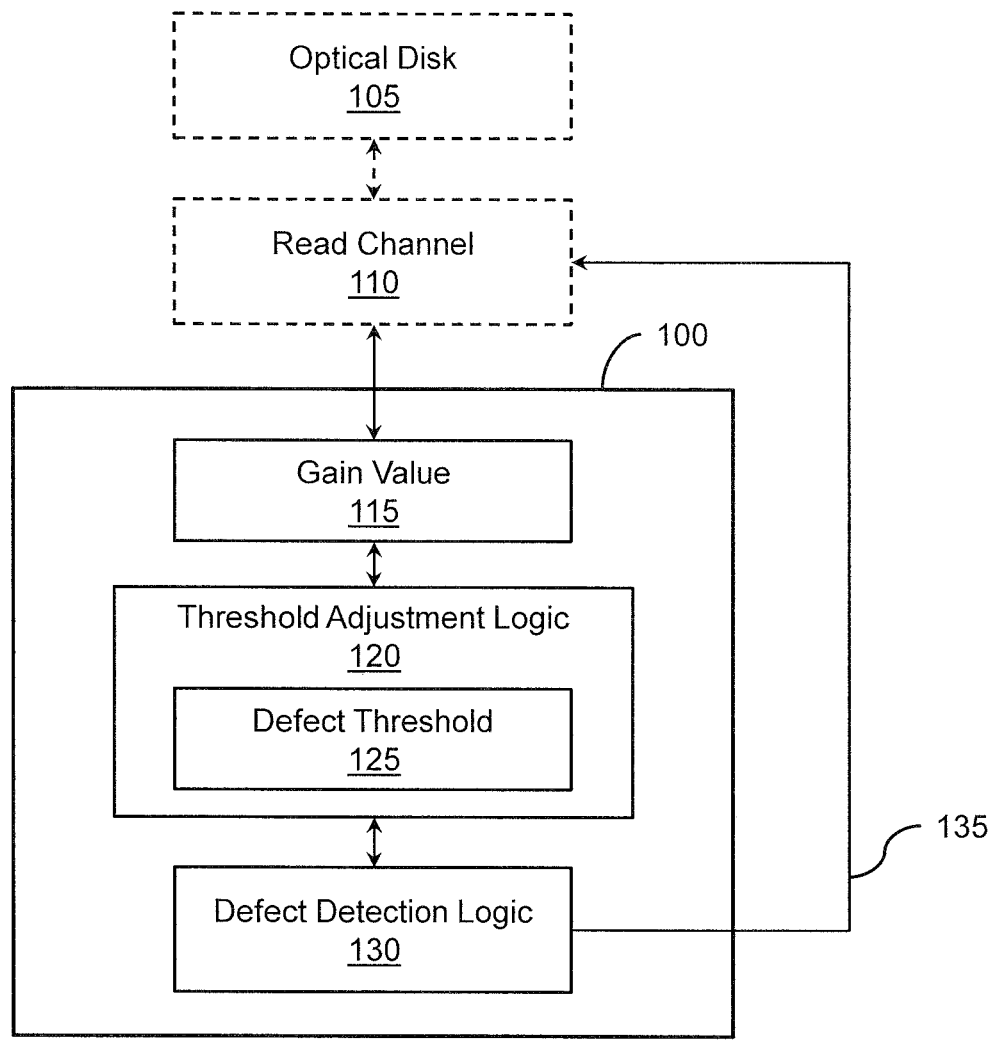
FIG. 1 illustrates an embodiment of an apparatus associated with adjusting a defect threshold.

Described herein are example methods and other embodiments associated with adjusting a defect threshold used to detect defects on a disc. In one embodiment, an apparatus is configured to determine when a read channel is processing data read from a defective portion of an optical disc. The apparatus may determine if there is a defect by comparing selected properties from the read channel (e.g. an analog-to-digital converter (ADC) output signal) to a defect threshold. When a defect threshold is crossed, the apparatus determines that the read channel is processing data from a defective portion of the disc. The apparatus can then notify the read channel and/or other devices that data is being processed from a defective portion of the disc. A notification signal may be used to control the read channel to take corrective action while the defective signal is being received (e.g. suspending control loop operations). In one or more of the embodiments described herein, the apparatus can more quickly detect that there is a defect on the disc.

In an optical disc reader, the gain loop tries to maintain the fixed signal amplitude range at the ADC when the data being read is bad. This may cause the defect detection to be affected when a fixed defect detection threshold is used. In one embodiment, the apparatus compensates for this by scaling a defect threshold by the gain value (or a function of the gain value). The scaling produces a scaled defect threshold. Defects can still be detected because as the ADC output signal is scaled, the defect threshold is also scaled. Data from a defective portion of the disc may be detected faster when using a defect threshold that is scaled than when using an un-scaled defect threshold. In another embodiment, the scaled defect threshold may be updated continuously as new data is processed by the read channel. The apparatus compares the ADC output signal to the scaled defect threshold. Data from a defective portion of the disc is identified when a value of the ADC output signal crosses the scaled defect threshold. The apparatus may generate and send a notification message to the channel logic when data from a defective portion of the disc is found. In response to the message, the read channel can suspend or alter some operations in the read channel until data from a non-defective portion of the disc is detected.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a data storage medium that stores signals, instructions and/or data. A computer-readable medium may take forms, including, but not limited to, non-volatile media, and volatile media. Non-volatile media may include, for example, optical discs, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disc (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 that is configured to detect a defective portion (area) of an optical disc 105. Data from the defective portion is read when a read laser of an optical disc drive is passing over the defective portion of the optical disc 105. The defective portion may be caused by, for example, a speck of dust, a scratch, dirt, or other imperfections or foreign objects on the optical disc 105. When the defective portion of the optical disc 105 is being read, an analog-to-digital converter (ADC) output signal of the read channel 110 will begin to move out of a fixed voltage range. The defective portion of the disc 105 is detected when the peak envelope amplitude of the ADC output signal crosses a threshold value.

In one embodiment, the apparatus 100 is configured to detect that the read channel 110 is reading the defective portion of the disc 105. The apparatus 100 receives a gain value 115 from the read channel 110. The read channel 110 adjusts the ADC output signal in proportion to the gain value 115 as discussed below. Threshold adjustment logic 120 in the apparatus 100 adjusts a defect threshold 125 based, at least in part, on the gain value 115. The apparatus 100 is implemented with defect detection logic 130 to compare an amplitude of the ADC output signal to the defect threshold 125. A defect is detected when the amplitude of the ADC output signal crosses the defect threshold 125.

In one example, the apparatus 100 can detect a defect by using an amplitude measurement of the ADC output signal received from the read channel 110. The amplitude measurement of the ADC output signal in the read channel 110 is normally within a fixed signal range, or envelope. However, when the read laser encounters a defect, the ADC output signal begins to move out of the fixed signal range. Identifying a defect may be made, at least in part, by determining if the amplitude measurement value crosses the defect threshold 125. The amplitude measurement decreases quickly when the read laser first encounters a defect on the optical disc 105. In other embodiments, other values or signal parameters of data read from the optical disc 105 instead of the amplitude measurement may be compared to the defect threshold 125.

In another embodiment, to keep the ADC output signal in a fixed signal range, the read channel 110 multiplies an analog signal by a version of the gain value 115. The adjusted analog signal is inputted to the ADC and the ADC output signal is adjusted back into the fixed signal range. In one embodiment, the fixed signal range may correspond to the top and bottom values of the signal, also known as the envelope.

By compensating the ADC output signal to try to keep the signal within the fixed voltage range, more time is spent for detecting the defective portion of the disc 105 than when no compensation is used. The time is longer because without the gain loop the ADC output signal is not compensated and, therefore, deteriorates and crosses the defect threshold 125 faster than when the voltage is compensated. The defect threshold 125 is an adjustable value. Adjustments may be made to the defect threshold 125 to reduce the effects of the gain loop compensation of the ADC output signal.

In one embodiment, the threshold adjustment logic 120 is configured to adjust the defect threshold 125. The defect threshold 125 is adjusted, at least in part, by the gain value 115 of the gain loop. The defect threshold 125 may be scaled in proportion to the gain value 115 to improve the speed that the defective portion of the disc 105 is detected. The defect threshold 125 may be adjusted by correlating, accumulating, and/or combining current and previous gain values 115 to the defect threshold 125. Other functions and other values may be correlated to the defect threshold 125. Other ways of adjusting the defect threshold 125 are discussed below with reference to FIGS. 3 and 4.

In another embodiment, when the defect is detected, a notice signal 135 is generated and sent by the defect detection logic 130 to the read channel 110. The notice signal 135 may be used to control the read channel 110 to take an appropriate action when a defect is detected. For example, looping actions in the read channel 110 may be suspended and some components of the read channel 110 may be turned off. Of course, other components associated with the read channel 110 may also be notified so that proper actions may be taken when the defective portion of the disc 105 is being read.

In one embodiment, the apparatus 100 may be implemented in a chip made out of semiconductor material. Logic devices may be fabricated on the chip to perform at least some of the functionality that the apparatus 100 is configured to perform. For example, complementary metallic oxide semiconductor (CMOS) transistors may be implemented on the chip to form some of the logic devices. The chip may be made out of other materials and the logic devices on the chip may be implemented with different electronic materials. In another embodiment, the apparatus 100 may be implemented with a combination of hardware and/or software stored on a computer-readable medium.

Figure 2:
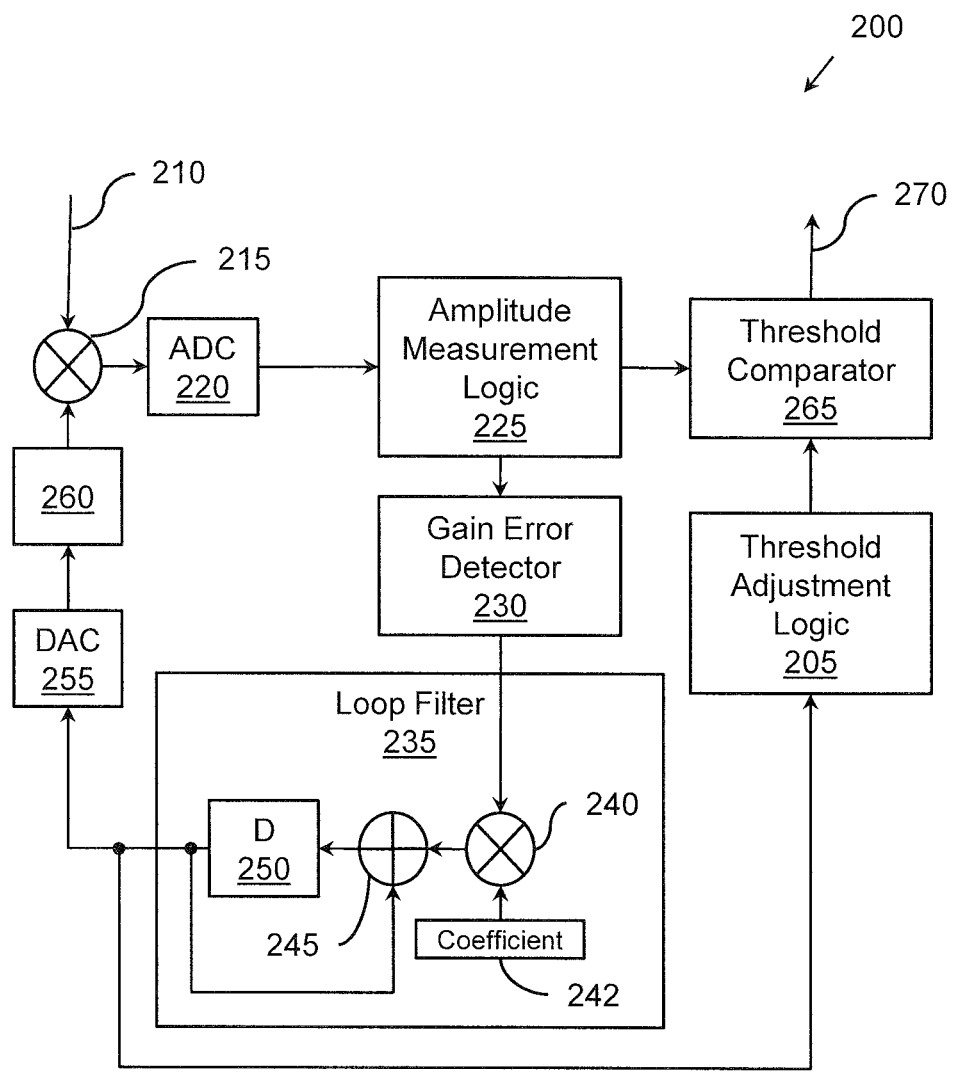
FIG. 2 illustrates an embodiment of a system associated with adjusting a defect threshold.

FIG. 2 illustrates one embodiment of a system 200 for determining when the defective portion of the disc is being read. The system 200 may contain portions of a read channel used to at least partially decode data read from the optical disc. The system 200 is implemented with threshold adjustment logic 205 that may be similar to the threshold adjustment logic 120 of FIG. 1.

In one embodiment, a first multiplier 215 receives a stream of analog data 210. The stream of analog data 210 corresponds to a stream of data read from an optical disc by an optical pickup unit (OPU). An analog-to-digital converter (ADC) 220 converts the output from the first multiplier 215 to a digital signal representing the ADC output signal.

A gain loop is formed by amplitude measurement logic 225, a gain error detector 230, a loop filter 235, a digital-to-analog converter (DAC) 255, and exponential logic 260. The gain loop generates an exponential gain value that is multiplied by the first multiplier 215 with the stream of analog data 210 to keep the magnitude of the ADC output signal within a magnitude range. To keep the magnitude within a magnitude range, first, the amplitude measurement logic 225 is configured to detect the magnitude of the ADC output signal. Next, the gain error detector 230 determines if a magnitude is within a magnitude range. If the magnitude is not in the magnitude range, then the gain error detector 230 will generate a gain error.

The gain error is input to the loop filter 235. The loop filter 235 is implemented with a second multiplier 240, an adder 245 and a delay element 250. The second multiplier 240 multiplies the gain error with a coefficient 242 to produce a gain value. The delay element 250 delays the gain value to produce a delayed gain value. The adder 245 adds the gain value and the delayed gain value to produce a gain value summation. In one embodiment, the gain value summation may correspond to the gain value 115 of FIG. 1. In one example, the delay element 250 is configured to delay the gain value by one clock cycle. Those of ordinary skill in the art will appreciate that the adder 245 and delay element 250 pair form an accumulator that accumulates gain values and delayed gain values. The loop filter 235 may be implemented with digital logic and/or stored executable software. In one embodiment, the delay element 250 may include a register or a group of flip-flops that store the gain value from the adder 245 for one clock cycle before passing gain value to a digital-to-analog converter (DAC) 255.

The DAC 255 converts the delayed gain value to an analog gain value. Exponential logic 260 may raise the analog gain value to an exponential gain value of the analog gain value. The exponential gain value is then multiplied by the first multiplier 215 with the stream of analog data 210. The ADC output signal will be in a suitable range when the stream of analog data 210 is multiplied with a proper exponential gain value.

In one embodiment, the threshold adjustment logic 205 is configured to adjust a defect threshold, as discussed above with reference to FIG. 1. The defect threshold is adjusted, based at least in part, on the gain value produced by the loop filter 235. In another embodiment, the defect threshold is adjusted based, at least in part, on the delayed gain value output from the delay element 250. The defect threshold may be scaled in proportion to the gain to improve the speed of defect detection. The defect threshold may be adjusted by correlating, accumulating, and/or combining current and previous gain values to the defect threshold. Other ways of adjusting the defect threshold are discussed below with reference to FIGS. 3 and 4.

With continued reference to FIG. 2, the magnitude of the ADC output signal measured by the amplitude measurement logic 225 and the defect threshold from the threshold adjustment logic 205 are input to a threshold comparator 265. The threshold comparator 265 compares the magnitude of the ADC output signal to the defect threshold to determine if the defect threshold has been exceeded. The data in the read channel is defective when the defect threshold is exceeded.

In other embodiments, different parameters of different read channel signals may be compared to different defect thresholds to determine if data in the read channel is defective. The threshold comparator 265 can send a signal 270 to other devices or the read channel when the data read by the read channel is defective. The other devices and the read channel may take appropriate action such as freezing looping actions in devices involved in the decoding of the data read from the optical disc while waiting for data from a non-defective portion of the disc to enter the read channel.

Figure 3:
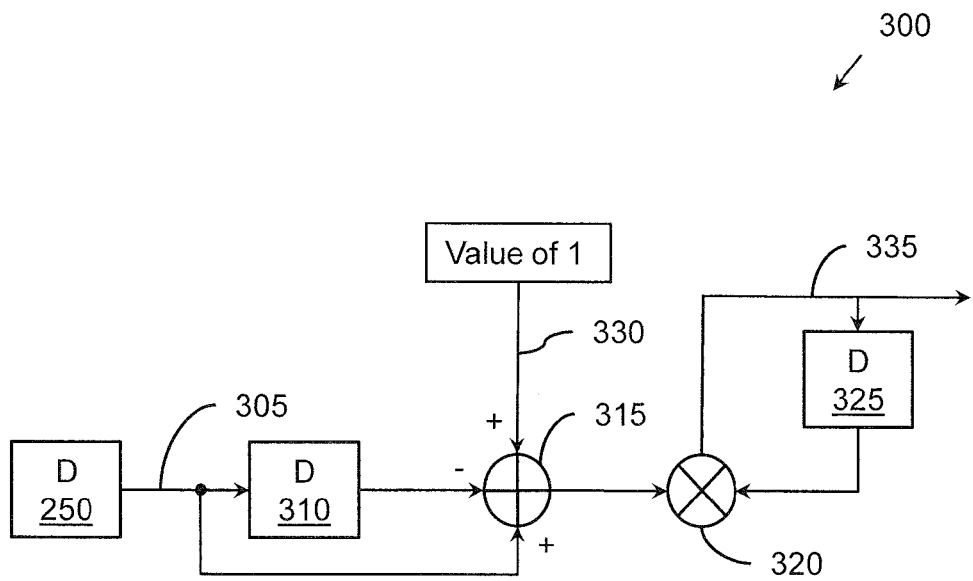
FIG. 3 illustrates another embodiment of defect threshold logic.

FIG. 3 illustrates another embodiment of threshold adjustment logic 205 of FIG. 2 and is labeled as threshold adjustment logic 300. The threshold adjustment logic 300 may operate with some of the functionality of the threshold adjustment logic 120 of FIG. 1 discussed above. A defect threshold is adjusted by the threshold adjustment logic 300, at least in part, by one or more gain values of a gain loop. The defect threshold is scaled in proportion to the change in the gain value at the output of the exponential logic 260 to improve the speed of detecting defective data from a defective portion of the disc is being processed by a read channel. The defect threshold may be adjusted by correlating, accumulating, and/or combining current and previous gain values to the defect threshold. By scaling the defect threshold based on one or more gain values, data from a defective portion of the disc in a read channel may be detected.

The gain values may correspond to the gain values of FIG. 1 and may be the output of a loop filter of the read channel (e.g. the output of delay element D 250 from FIG. 2). The gain values may be received from an automatic gain control unit at an input line 305. The automatic gain control unit keeps a peak-to-peak value of an output of an analog-to-digital converter (ADC) of the read channel within a threshold range of values.

In one embodiment, the threshold adjustment logic 300 is implemented with a first delay logic 310, an adder 315, a multiplier 320, and a second delay logic 325. The gain values are sequentially presented to the first delay logic 310. The first delay logic 310 and the second delay logic 325 may be flip-flops, registers, or other electronic devices that can store and/or delay signals. For example, the first and second delay logic 310, 325 may be flip-flops that delay inputs to the flip-flops by one clock cycle. In another embodiment, the first delay logic 310 delays gain values an integer number of M clocks before the gain values reach the adder 315.

In one embodiment, the output of the first delay logic 310 may be a negative magnitude of the gain value. The adder 315 is configured to combine (e.g., add) negative and positive values. The adder 315 is configured to add a non-delayed version of the gain value to the output of the first delay logic 310. A value of "1" (e.g., constant of "1") may additionally be another input on line 330 to the adder 315 that is also summed by the adder 315. This value may be a fixed value. The output of the adder 315 may correspond to a threshold adjustment of:

threshold_adjustment[$k$+1]=threshold_adjustment[$k$]
\*exp(loop_gain[$k$+1]−loop_gain[$k$])

where "k" is the "$k^{th}$" clock cycle and "exp" is an exponential value of (loop_gain[k+1]−loop_gain[k]). The threshold adjustment may be approximated as:

threshold_adjustment[$k$+1]=threshold_adjustment[$k$]\*
(1+loop_gain[$k$+1]−loop_gain[$k$])

The threshold adjustment output from the adder 315 may be other values based, at least in part, on a gain. The loop gain is the output of the delay element D 250 in FIG. 2.

In one embodiment, the output of the adder 315 is input to the multiplier 320 where it is multiplied by a delayed defect threshold from the second delay logic 325. The second delay logic 325 may delay the defect threshold from output line 335 by one clock cycle before presenting the delayed defect threshold to the multiplier 320. The multiplier output becomes the current threshold value. The current threshold value is now output from the threshold logic 300 on the output line 335.

Figure 4:
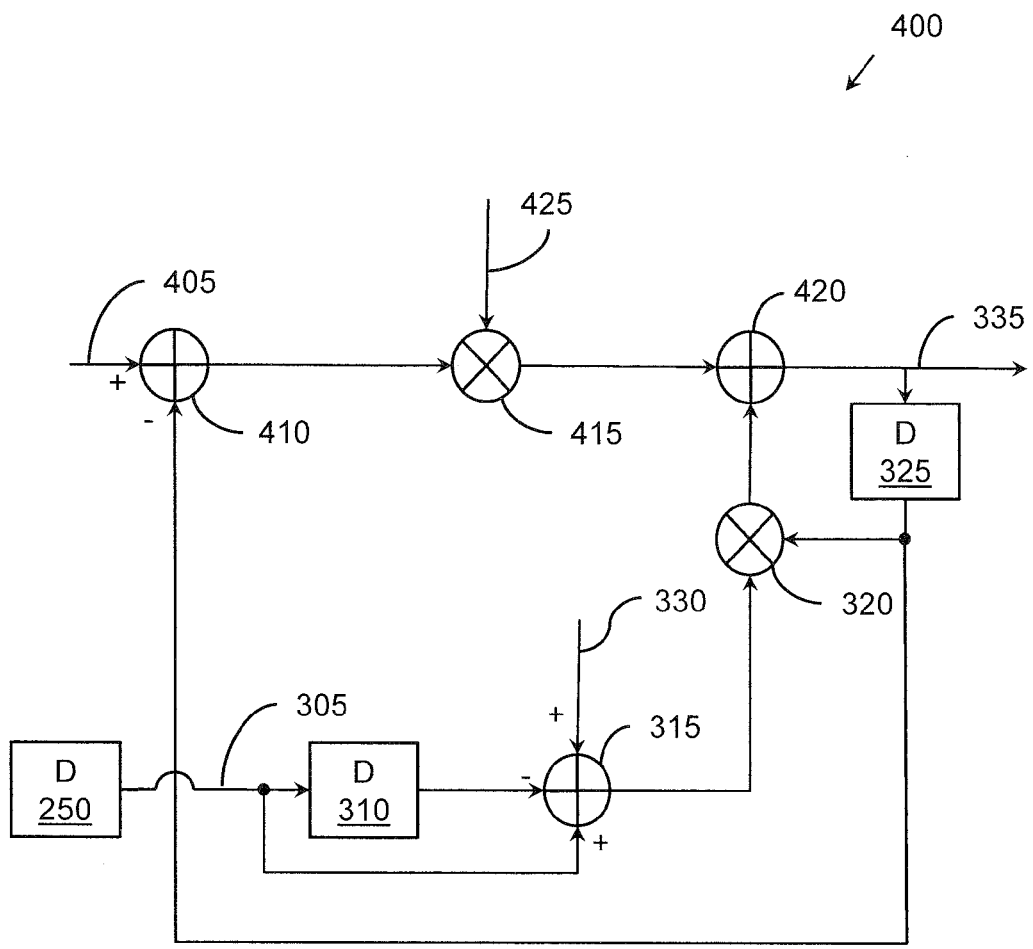
FIG. 4 illustrates another embodiment of defect threshold logic.

FIG. 4 illustrates another embodiment of the threshold adjustment logic 205 of FIG. 2 and is labeled as threshold adjustment logic 400. The threshold adjustment logic 400 may operate with some functionality of the threshold adjustment logic 120 of FIG. 1 and/or the threshold adjustment logic 300 discussed above. Similar elements are labeled with the same reference numerals.

Similar to the threshold adjustment logic 300 of FIG. 3, the threshold adjustment logic 400 is configured to adjust a defect threshold. The defect threshold is adjusted, at least in part, by one or more gain values of a gain loop. The defect threshold is scaled in proportion to the gain values to improve the speed of detecting data from a defective portion of the disc being processed by a read channel. The defect threshold may be adjusted by correlating, accumulating, and/or combining current and previous gain values to the defect threshold. By scaling the defect threshold based on one or more gain values, data from a defective portion of the disk may be detected faster.

In one embodiment, the threshold adjustment logic 400 is implemented with first delay logic 310, an adder 315, a multiplier 320, and a second delay logic 325 that are similar to corresponding components in FIG. 3. Input to the first delay logic 310 is the output of the delay element D 250 (shown in FIG. 2). The threshold adjustment logic 400 receives a reference threshold from a second input line 405. The threshold adjustment logic 400 is configured to apply the reference threshold to the defect threshold after being operated on by a second adder 410, a second multiplier 415, and a third adder 420. The reference threshold is applied to the defect threshold in order to push the defect threshold toward the reference threshold over time. The reference threshold may be a reference voltage.

At the beginning of a read operation, an optical sensor of an optical disc drive may produce a signal that is un-determined. The un-determined signal with an undesired magnitude may be an output signal of an analog-to-digital converter (ADC). The gain loop magnifies the output signal with the undesired magnitude to the desired magnitude. While the gain loop is correcting the undesired magnitude, the gain values will reflect values used to correct the undesired magnitude. The defect threshold may be an un-determined value until the undesired magnitude is corrected. To prevent an undesired defect threshold caused by uncertainties at the beginning of a read operation, the threshold adjustment logic 400 biases the defect threshold toward the reference threshold.

The defect threshold is biased by summing a delayed defect threshold and the reference threshold with the second adder 410. In one embodiment, the second adder 410 is configured to sum the reference threshold and a negative value of the delayed defect threshold (e.g., the second adder 410 generates the difference between the reference threshold and the delayed defect threshold). The second multiplier 415 is configured to apply a gain coefficient "h" (value on line 425) to the output of the second adder 410. The second multiplier output is summed by the third adder 420 with the output of multiplier 320 to produce the defect threshold. In general the gain coefficient "h" is smaller than the threshold adjustment output from the adder 315 that biases the defect threshold via multiplier 320.

The threshold adjustment from the adder 315 is faster than the gain coefficient of "h" so that when an ADC output signal abruptly changes due to data being read from a defective portion of the disc, the defect threshold can be used to detect the data. The data from a defective portion of the disc can be detected because the defect threshold is more strongly biased by the output of adder 315 than the gain coefficient "h". However, the defect threshold will be slowly pushed back to the reference threshold by the gain coefficient "h" when the ADC output signal is not within the range of values and there is no abrupt change in the ADC output signal.

Figure 5:
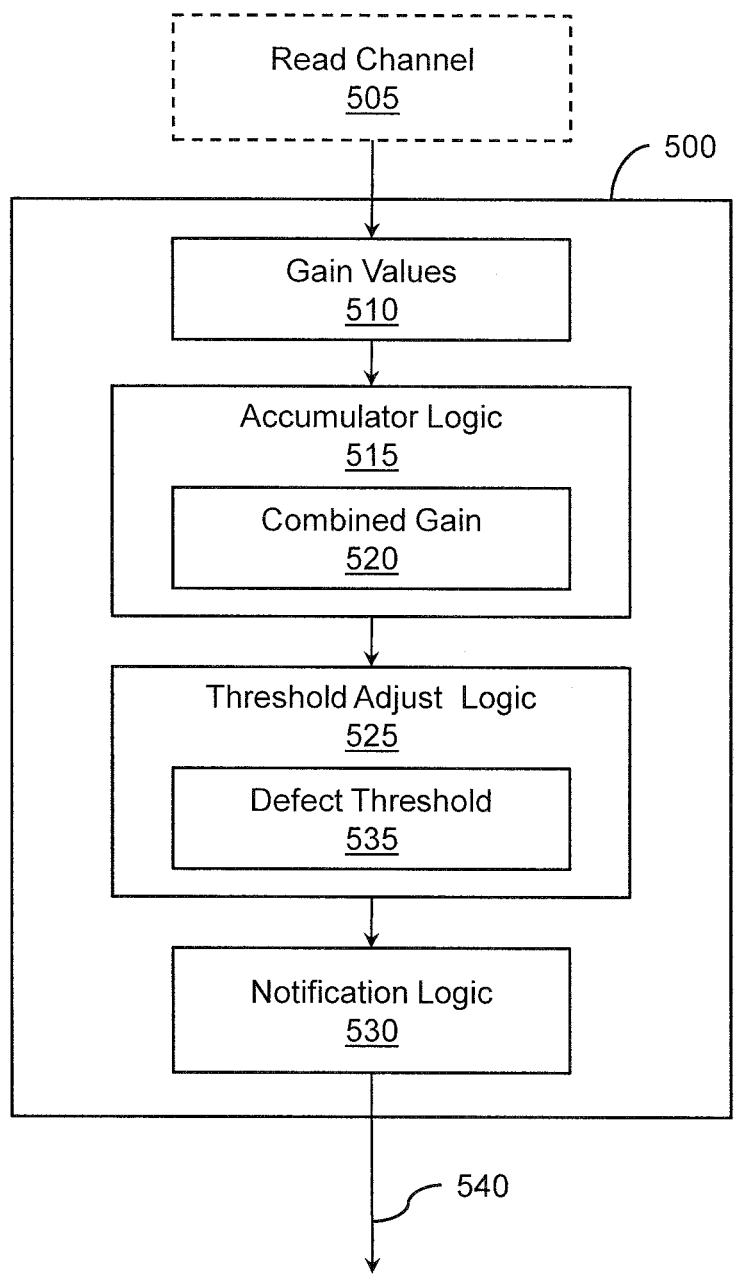
FIG. 5 illustrates another embodiment of an apparatus associated with adjusting a defect threshold.

FIG. 5 illustrates one embodiment of an apparatus 500 that is configured to detect data read from a defective portion of an optical disc. The data may be data that is read when a read laser of an optical disc drive is passing over a defect as previously discussed. When a defective area of the optical disc is being read, an analog-to-digital converter (ADC) output signal of the read channel 505 will begin to move out of a fixed voltage range. Data is being read from a defective portion of the disc by the read channel 505 when the ADC output signal is far out of the fixed voltage range. To keep the ADC output signal in a fixed voltage range, the read channel 505 multiplies an analog signal in the read channel 505 by a version of a gain value.

To detect the data, the apparatus 500 first receives gain values 510 from the read channel 505. Accumulator logic 515 within the apparatus 500 is configured to combine gain values to produce a combined gain 520. The combined gain 520 can be an average of a fixed number of received gain values. The apparatus 500 is also implemented with threshold adjust logic 525 and notification logic 530. The threshold adjust logic 525 is configured to adjust a defect threshold 535 based, at least in part, on the combined gain 520. The defect threshold 535 may correspond to a point that an amplitude of the ADC output signal crosses when read channel data is likely data from a defective portion of the disc. Comparators in the notification logic 530 may be configured to compare the defect threshold 535 with an amplitude of the ADC output signal to determine when the defect threshold 535 is crossed.

The notification logic 530 is configured to notify the read channel 505 or other devices that data from a defective portion of the disc is detected when the defect threshold 535 is crossed. The notification may be sent over an output connection 540 to the read channel 505 or other devices. The read channel 505 and other devices may freeze portions of the read channel 505, stop or alter control loops, and/or take other appropriate actions when data from a defective portion of the disc has been read.

The threshold adjust logic 525 can be configured to adjust the defect threshold 535 in a variety of ways. In one embodiment, the defect threshold 535 is scaled, at least in part, by the gain values 510 of the gain loop. The defect threshold 535 may be scaled in proportion to the gain values 510 to improve the speed of detecting data from a defective portion of the disc. The defect threshold 535 may be adjusted by multiplying, correlating, accumulating, and/or combining current and previous gain values 510 to the defect threshold 535. Correlating, accumulating, and combining may include combining both positive and negative numbers. Based on the disclosure and other teachings provided herein, other functions and other values may be correlated to the defect threshold 535 as understood by those with ordinary skill in the art.

In one embodiment, a non-delayed gain value corresponds to one of the gain values 510. The accumulator logic 510 combines a delayed gain value and an inverted value of the non-delayed gain value to produce a combined value. The combined gain 520 is based, at least in part, on the combined value. The combined value may be scaled and the defect threshold 535 is based on the scaled combined value. The accumulator logic 515 may combine multiple gain values 510 as well as other values. The accumulator logic 515 may be implemented with the first delay logic 310 and adder 315 of FIG. 3 or the loop filter 235 of FIG. 2. In another embodiment, the non-delayed gain value is separated from the delayed gain value by N clock cycles. N may be a programmable value.

In one embodiment, the accumulator logic 515 combines a value of one (e.g., a constant of "1") and the delayed gain value to produce an initial value. The accumulator logic 515 combines the initial value and the inverse of the non-delayed gain value to produce a combined value. In another embodiment, the accumulator logic 515 subtracts the non-delayed gain value from the initial value.

At the beginning of a read operation, an optical sensor of an optical disc drive may produce a signal that is undetermined which in turn may cause the defect threshold 535 to be undetermined as discussed above. To account for this, in one embodiment, the apparatus 500 is implemented with a biasing logic to prevent the defect threshold 535 from being undetermined. The biasing logic may bias the defect threshold 535 as discussed above with reference to FIG. 4. The biasing logic is configured to receive a reference threshold. The biasing logic biases the defect threshold 535 to the reference threshold. The biasing logic can bias the defect threshold 535 by multiplying the reference threshold to the defect threshold 535 with a gain of "h".

The defect threshold 535 is larger than the gain of "h" so that when an ADC output signal abruptly changes due to data being read from a defective portion of the disc, the defect threshold 535 can be used to detect the data from the defective portion of the disc. The data can be detected because the defect threshold 535 is more strongly biased by the threshold adjust logic 525 than the gain of "h". However, the defect threshold 535 will be slowly pushed back to the reference threshold by the gain of "h" when the ADC output signal is not within the range of values and there is no abrupt change in the ADC output signal.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
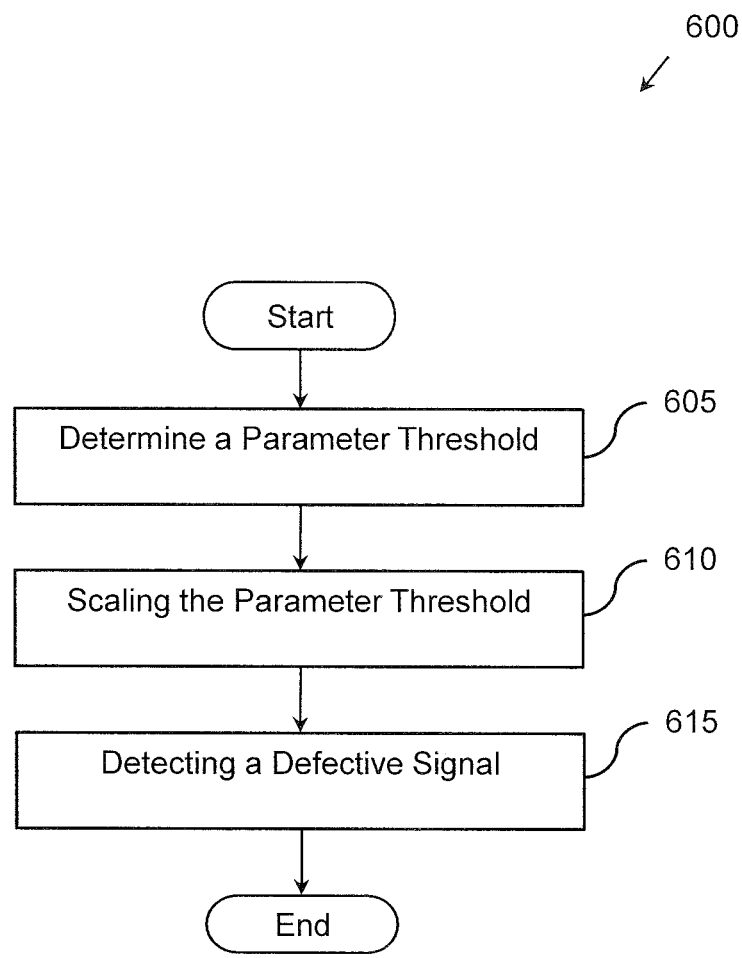
FIG. 6 illustrates an embodiment of a method associated with adjusting a defect threshold.

FIG. 6 illustrates an embodiment of a method 600 associated with adjusting a defect threshold. The defect threshold can be used to detect data read from a defective portion of an optical disc as previously discussed. An analog-to-digital converter (ADC) output signal of the read channel will begin to move out of a fixed voltage range when a defective portion of the optical disc is being read. Data is being read from the defective portion of the disc by the read channel when the ADC output signal crosses the defect threshold. The method 600 may generate and transmit a signal(s) to notify the read channel or other devices that data has been read from the defective portion of the optical disc. The notification signals can be used to control and/or cause actions in the read channel (e.g. freeze control loops, and/or alter loop settings and/or take other corrective actions) in response to the detected defect.

The method 600 begins by determining a parameter threshold, at 605. For example, the parameter threshold may be a threshold voltage. The threshold voltage corresponds to the ADC output signal. As discussed below, when the ADC output signal exceeds the parameter threshold, a detection is made that the read channel is processing data from the defective portion of the disc.

Gain values are used by a gain loop of the read channel to keep the ADC output signal within a fixed range as discussed above. Even when the read channel is processing data from the defective portion of the disc, the gain loop tries to correct the ADC output signal when the ADC output signal drops.

In one embodiment, the parameter threshold is scaled, at 610, as a function of one or more gain values of the read channel. The scaling, at 610, can reduce the effects of the gain loop slowing down the detection of data from a defective portion of the disc by correcting the ADC output signal. This is because as the ADC output signal drops, the parameter threshold (e.g., threshold level) is scaled in proportion to the drop. The proportional scaling allows the defective portion of the disc to be detected faster than when the parameter threshold is not scaled.

The parameter threshold may be adjusted by correlating, accumulating, and/or combining current and previous gain values to the parameter threshold. Other functions and other values may be correlated to the parameter threshold as understood by those with ordinary skill in the art. Other ways of adjusting the parameter threshold are discussed above with reference to FIGS. 3 and 4.

In one embodiment, a defective signal is detected, at 615. The defective signal is detected when a signal parameter of a signal being processed by the read channel crosses the parameter threshold. For example, the defective signal is detected when the ADC output signal drops below the threshold level. The method 600 may notify other devices and/or the read channel when data from a defective portion of the disc is detected so that appropriate action may be taken.

Figure 7:
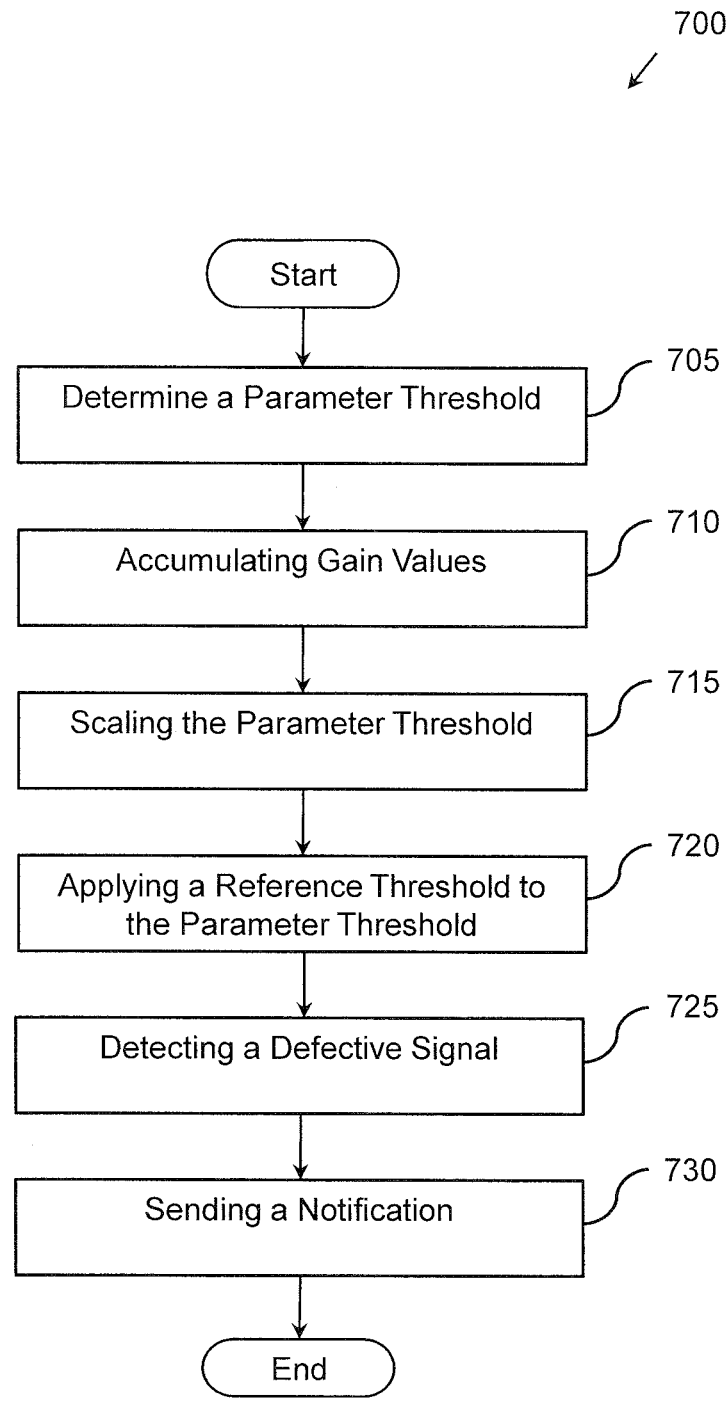
FIG. 7 illustrates another embodiment of a method associated with adjusting a defect threshold.

FIG. 7 illustrates an embodiment of a method 700 associated with adjusting a defect threshold that can be used to detect that data from a defective portion of the disc has been read by a read channel from an optical disc. The method 700 begins similar to method 600 by determining a parameter threshold, at 705. The parameter threshold may be a defect threshold that corresponds to a signal level of an analog-to-digital converter (ADC).

In one embodiment, a first gain value and a second gain value are accumulated at 710. The first gain value and the second gain value may be generated by the gain loop of the read channel associated with the optical disc. The first gain value and the second gain value are separated in time. The gain loop may produce a gain value during a clock cycle. The first gain value and the second gain value may correspond to adjacent clock cycles.

The parameter threshold is scaled, at 715, as a function of one or more gain values of the read channel. The scaling, at 715, is similar to the scaling, at 610, in FIG. 6. The scaling, at 715, is based, at least in part, on a difference of the first gain value and the second gain value. As discussed above, the scaling, at 715, can reduce slowing down the detection of data from a defective portion of the disc because a gain loop of the read channel is correcting an ADC output signal. In another embodiment, the scaling, at 715, exponentially scales the parameter threshold.

In one embodiment, a reference threshold is applied to the parameter threshold to move the parameter threshold toward the reference threshold. The reference threshold is applied with a bias gain. The parameter threshold is biased by multiplying the reference threshold to the parameter threshold proportional to a bias gain of "h" and adding the product to the parameter threshold as discussed above with reference to FIG. 4 (value of "h" on line 425).

A defective signal is detected, at 725. The defective signal may be detected, at 725, when a read channel voltage crosses the parameter threshold as discussed above. The detecting, at 725, is similar to the detecting, at 615, of FIG. 6.

A notification signal is generated and sent, at 730, when data from a defective portion of the disc is detected. The notification is sent, at 730, to the read channel and/or other devices associated with decoding the data read from the optical disc. The notification signal causes the read channel and other devices to take appropriate actions such as stopping control loop actions associated with decoding the data, and so on.

It will be appreciated that the methods described herein or their equivalents may be at least partially implemented in a chip, or in one or more circuits. The chip may be comprised of semiconductor circuits or other types of circuits as understood by those of ordinary skill in the art. The semiconductor circuits implement logic to perform at least part of the method 600. In another embodiment, components described herein may be implemented with a combination of hardware and/or stored executable software. It will be appreciated that in one embodiment, the methods herein may be implemented as computer executable instructions embodied and stored on a computer-readable medium. When executed by a machine (e.g., processor, device) the instructions cause the machine to perform the methods herein or their equivalents.

Figure 8:
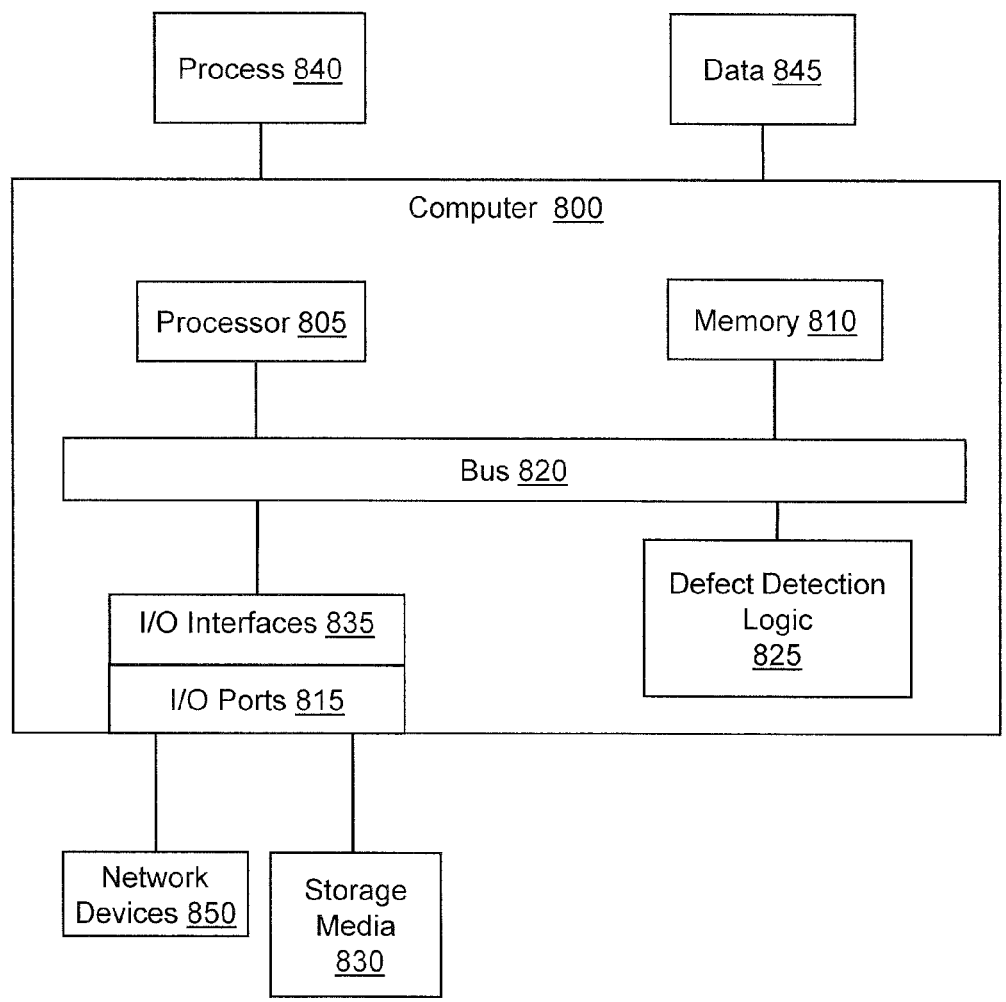
FIG. 8 illustrates an embodiment of a computing environment in which example systems and methods, and equivalents associated with adjusting a defect threshold may operate.

FIG. 8 illustrates one embodiment of an example computer 800 in which example systems and methods described herein, and equivalents, are implemented. The example computer 800 comprises a processor 805, a memory 810, and input/output ports 815 operably connected by a bus 820. In one example, the computer 800 is implemented with defect detection logic 825 configured to detect data that has been read from a defective portion of an optical disc. In one embodiment, the defect detection logic 825 is configured to adjust a defect threshold based, at least in part, on gain values of a gain loop of a read channel that is decoding data read from the optical disc.

The defect detection logic 825 provides means (e.g., hardware, stored software, and firmware) to detect data read from the defective portion of the optical disc. The defect detection logic 825 can be implemented similar to apparatus 100 of FIG. 1 and apparatus 500 of FIG. 5 and/or combinations of their features. The defect detection logic 825 can include logic implemented, for example, as an ASIC or other type of circuit.

Generally describing an example configuration of the computer 800, the processor 805 may be a variety of various processors including dual microprocessor and other multiprocessor architectures. A memory 810 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A storage media 830 may be operably connected to the computer 800 via, for example, through an input/output interface (e.g., card, device) 835 and the input/output port 815. The storage media 830 may be, for example, a magnetic disk drive, a solid state disk drive, a floppy disk drive, a tape drive, a Zip drive, a flash memory card, a memory stick, and so on. Furthermore, the storage media 830 may be a compact disc read-only memory (CD-ROM) drive, a compact disc recordable (CD-R) drive, a compact disc rewritable (CD-RW) drive, a digital video disc read-only memory (DVD ROM), and so on. The memory 810 can store a process 840 and/or a data 845, for example. The storage media 830 and/or the memory 810 can store an operating system that controls and allocates resources of the computer 800.

The bus 820 may be a single internal bus interconnect architecture and/or other bus or mesh architectures. While a single bus is illustrated, it is appreciated that the computer 800 may communicate with various devices, logics, and peripherals using other busses (e.g., peripheral component interconnect express (PCIE), 1394, universal serial bus (USB), Ethernet). The bus 820 can be types including, for example, a memory bus, a memory controller, a peripheral bus, an external bus, a crossbar switch, and/or a local bus.

The computer 800 may interact with input/output devices via the input/output (I/O) interfaces 835 including the defect detection logic 825 and the input/output ports 815. Input/output devices may be, for example, a keyboard, a microphone, a pointing and selection device, cameras, video cards, displays, the disc storage media 830, the network devices 850, and so on. The input/output ports 815 may include, for example, serial ports, parallel ports, and USB ports.

The computer 800 can operate in a network environment and thus may be connected to the network devices 850 via the I/O interfaces 835, and/or the I/O ports 815. Through the network devices 850, the computer 800 may interact with a network. Through the network, the computer 800 may be logically connected to remote computers. Networks with which the computer 800 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    defect detection logic configured to determine, using a defect threshold, if a read channel has read data from a defective portion of an optical disc; and
    threshold adjustment logic configured to adjust the defect threshold based, at least in part, on a gain value of a gain loop associated with the read channel;

wherein the threshold adjustment logic is configured to adjust the defect threshold by correlating the defect threshold to the gain value and a delayed gain value of the gain loop.

2. The apparatus of claim 1, wherein the threshold adjustment logic is configured to adjust the defect threshold by correlating the defect threshold to an exponential of a difference between the gain value and a delayed gain value of the gain loop.

3. The apparatus of claim 1, wherein the threshold adjustment logic is configured to adjust the defect threshold by multiplying the defect threshold with a combined value based on: a value of one, the gain value, and a delayed gain value of the gain loop.

4. The apparatus of claim 1, wherein the threshold adjustment logic is further configured to adjust, at least in part, the defect threshold by combining a delayed version of the defect threshold with the defect threshold.

5. The apparatus of claim 1, wherein the threshold adjustment logic is further configured to bias the defect threshold to a reference threshold.

6. The apparatus of claim 1, wherein the gain value is received from an automatic gain control unit, where the automatic gain control unit keeps a peak-to-peak value of an output of an analog-to-digital converter of the read channel within a threshold range of values.

7. The apparatus of claim 1, wherein the defect detection logic is configured to notify the read channel that defective data from the defective portion of the optical disc has been read, where the determination that the read channel has read data from the defective portion of the optical disc is based, at least in part, on a signal parameter of data read from the optical disc crossing the defect threshold.

8. An apparatus, comprising:
accumulator logic configured to combine gain values from a gain loop of a read channel to produce a combined gain;
threshold adjustment logic configured to adjust a defect threshold based, at least in part, on the combined gain; and
notification logic configured to notify the read channel that a defect is detected when the defect threshold is crossed.

9. The apparatus of claim 8, where the accumulator logic is configured to combine a delayed gain value and an inverted value of a non-delayed gain value to produce the combined gain value.

10. The apparatus of claim 9, where the non-delayed gain value is separated from the delayed gain value by N clock cycles.

11. The apparatus of claim 10, where N is a programmable value.

12. The apparatus of claim 8, where the combined gain is based on a combination of: a value of one, a non-delayed gain value, and a delayed gain value.

13. The apparatus of claim 12, where the accumulator logic is configured to combine the value of one and the delayed gain value to produce an initial value, where the accumulator logic is configured to combine the initial value and a negative value of the non-delayed gain value to produce a combined value, and where the combined gain is based, at least in part, on the combined value.

14. The apparatus of claim 8, further comprising biasing logic configured to bias the defect threshold to a reference threshold.

15. A method comprising:
determining a parameter threshold;
scaling the parameter threshold as a function of one or more gain values from a gain loop of a read channel;
accumulating, at least in part, a first gain value and a second gain value that are separated in time, wherein the parameter threshold is scaled based, at least in part, on a difference of the first gain value and the second gain value; and
detecting a defective signal when a signal parameter of a signal being processed by the read channel crosses the parameter threshold.

16. The method of claim 15, further comprising:
applying a reference threshold to the parameter threshold with a bias gain to move the parameter threshold toward the reference threshold.

17. The method of claim 15, further comprising:
sending a notification to a device when the signal parameter crosses the parameter threshold.

18. The method of claim 15, where the scaling exponentially scales the parameter threshold.

* * * * *